Aug. 25, 1959     J. E. BEATMAN     2,900,867
KALEIDOSCOPE
Filed Sept. 17, 1956
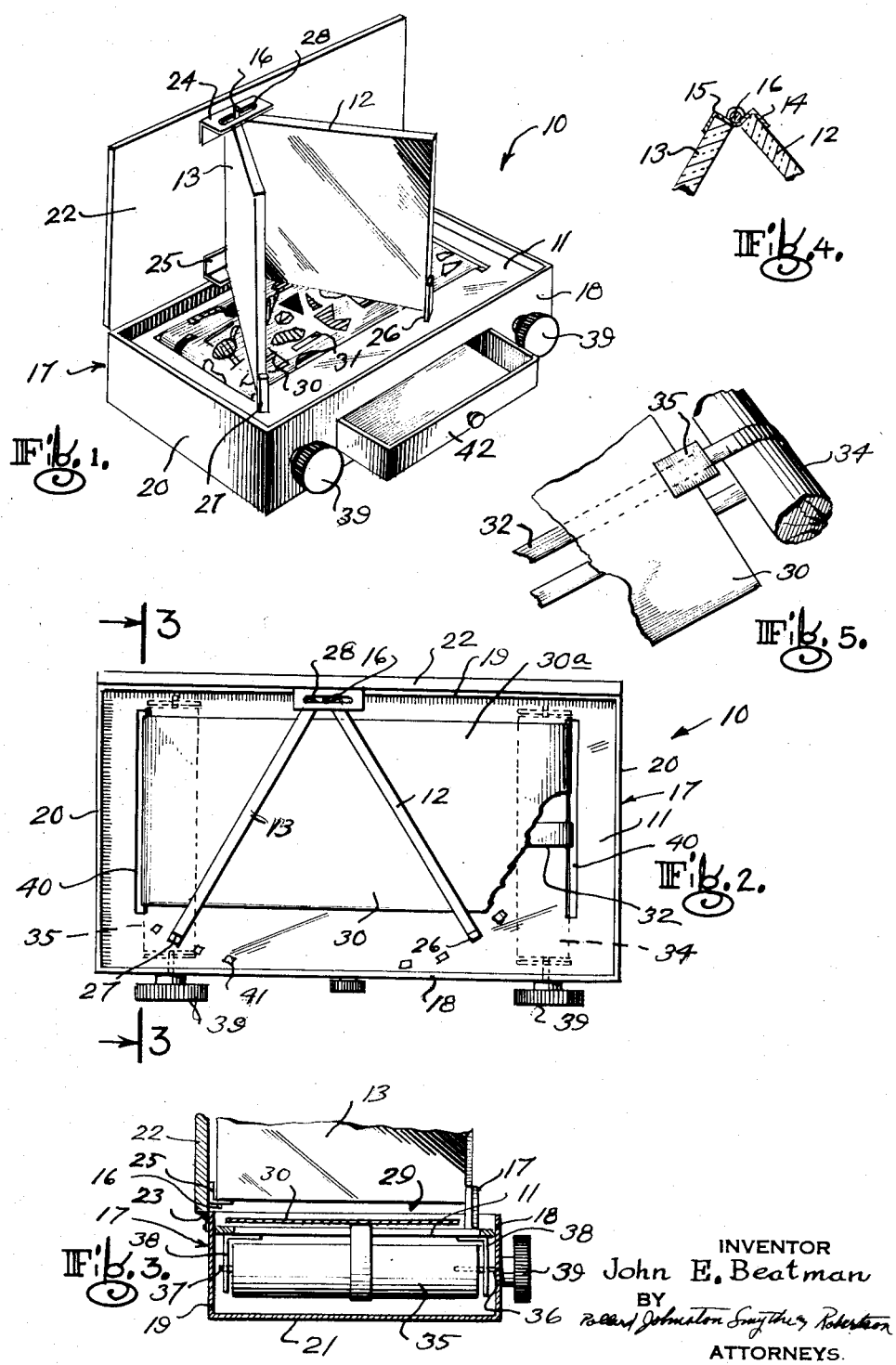
INVENTOR
John E. Beatman
BY
ATTORNEYS.

United States Patent Office 2,900,867
Patented Aug. 25, 1959

2,900,867

KALEIDOSCOPE

John E. Beatman, South Norwalk, Conn.

Application September 17, 1956, Serial No. 610,337

3 Claims. (Cl. 88—15)

This invention relates to kaleidoscopes, and more particularly is directed to an improved device for creating a great variety of kaleidoscopic designs from miscellaneous materials, articles and the like.

In a kaleidoscope embodying this invention, a pair of mirrors are hingedly secured to each other and disposed over a flat base with the plane of the latter being at right angles to the hinge axis of the mirrors so that, when the mirrors are angularly spaced apart, kaleidoscopic designs can be created by placing scraps of colorful material, such as, cotton, tinfoil, cellophane, yarn and the like, or miscellaneous articles upon the base in the portion of the latter disposed between the spread apart mirrors.

An object of the invention is to provide a kaleidoscope of the above described character that embodies a particularly convenient arrangement of the parts affording unobstructed access to the space between the spread apart mirrors for ease in arranging and rearranging the miscellaneous materials, articles and the like used to create the design and for viewing of the kaleidoscopic image in the mirrors.

Another object is to provide a kaleidoscope of the described character, wherein the lower edges of the mirrors are spaced upwardly from the base to provide gaps through which a movable strip of cloth, paper or other sheet material can pass, so that, when various flat and relatively bulky materials, articles and the like, are arranged on the movable strip between the spread apart mirrors to form a design and the strip is moved through the gaps, certain of the flat materials or articles can pass through the gaps out of the range of the mirrors while the more bulky materials and articles strike against the lower edge portion of a mirror and are thereby retained and rearranged within the area or field between the mirrors, thus serving to animate the retained materials and articles.

In accordance with an aspect of the invention, the movable strip supporting the miscellaneous materials, articles and the like, is further intended to carry two-dimensional design components which may be permanently applied thereto, as by printing, in which case the strip is preferably replaceable to permit the interchangeable use of various strips having different predetermined designs thereon, or the two-dimensional designs may be painted or drawn on the movable strip by the operator of the kaleidoscope.

In accordance with another aspect of the invention, a pair of spaced apart, rotatable spools are arranged under the base and have an endless belt extending therearound and passing through slots in the base, with the replaceable strips being removably secured to the belt for movement with the latter over the base between said slots in response to rotation of the spools.

Another feature of kaleidoscopes embodying the invention resides in the inclusion of the base thereof in a storage case or container having a hinged cover on which the hingedly connected mirrors are mounted with the hinge axes of the cover and mirrors, respectively, being disposed at right angles to each other so that, when the mirrors are folded flat against the underside of the cover, the latter may be closed, and, when the cover is swung upwardly to its open position, the mirrors tend to swing away from the cover to their operative, spread apart positions in which the mirrors bear upon the base within the open case.

In a preferred embodiment of the invention, the mirrors have depending feet adjacent their edges remote from the hinge axis of the mirrors to engage the base and thereby space the lower edges of the mirrors from the base for defining the gaps therebetween through which the movable strip can pass, and the base is provided with suitably located recesses or marks in which the depending feet may be placed for disposing the mirrors so that the latter produce the desired kaleidoscopic effect. Further, the mounting of the hinged mirrors on the cover of the storage case or container is arranged to permit some play of the hinged axis of the mirrors relative to the cover so that the depending feet of the mirrors will be capable of simultaneously bearing upon the base to hold the mirrors in the operative, spread apart positions of the latter even when the mounting of the mirrors is accomplished without great accuracy.

The above, and other objects, features and advantages of the invention will be apparent in the following detailed description of an illustrative embodiment thereof which is to be read in connection with the accompanying drawing forming a part hereof, and wherein:

Fig. 1 is a perspective view of a kaleidoscopic device embodying the present invention and shown in its operative condition;

Fig. 2 is a top plan view of the kaleidoscopic device of Fig. 1, but with an element thereof being partly broken away to expose the underlying structure;

Fig. 3 is a sectional view taken along the line 3—3 of Fig. 2;

Fig. 4 is an enlarged, fragmentary sectional view showing a constructional detail of the kaleidoscopic device of Figs. 1, 2 and 3; and Fig. 5 is a fragmentary perspective view showing details of an assembly included in the kaleidoscopic device of Figs. 1, 2 and 3.

Referring to the drawing in detail, and initially to Figs. 1 and 2 thereof, it will be seen that a kaleidoscopic device embodying the present invention, and there generally identified by the reference numeral 10, includes a flat base 11 and a pair of mirrors 12 and 13 which are adapted to be disposed above the base 11 with the mirrors extending normal to the flat plane of the latter and enclosing a predetermined angle to provide a multiplied or kaleidoscopic image of design elements located on the portion of the base between the mirrors when the mirrors are viewed in the general direction in which the planes thereof converge.

In the kaleidoscopic device 10, the mirrors 12 and 13 are hingedly connected together along one side edge, for example, by interfitting hinge barrel elements 14 and 15 suitably secured to the corresponding side edge portions of the mirrors 12 and 13, respectively, and pivotally joined to each other by an elongated hinge pin 16 (Fig. 4) so that the mirrors can be folded flat against each other for convenient storage, as hereinafter described in detail, or arranged to enclose various angles for providing different multiplications of the design arranged on the base 11 between the mirrors.

Preferably, the kaleidoscopic device 10 includes a case or container 17 having front and back walls 18 and 19, side walls 20 and a bottom wall 21 with the base 11 being suitably secured within the case 17 and spaced upwardly from the bottom wall 21 of the latter (Fig. 3). A suitable cover 22 is hingedly connected, as at 23 (Fig. 3), to the case 17 for swinging relative to the latter about a hinge axis extending along the upper edge of back wall 19 so that the cover can be moved between an upstanding, open position, as shown in Figs. 1, 2 and 3, and a horizontal closed position overlying the base 11.

The hingedly secured together mirrors 12 and 13 are pivotally mounted on the cover 22 with the hinge axis of the mirrors, defined by the pin 16, extending substantially at right angles to the swinging axis of the cover, as defined by the hinged connection 23. Such pivotal mounting of the mirrors on the cover is conveniently effected by extending the opposite ends of the hinge pin 16 beyond the upper and lower edges of the mirrors 12 and 13 to be received in suitably apertured angle-member brackets 24 and 25 secured to the face of the cover 22 which is lowermost when the latter is in its closed position. By reason of the pivotal mounting of the hingedly secured together mirrors on the cover, the mirrors 12 and 13 can be folded flat against each other and then pivoted together to one side of their hinge axis to lay against the cover 22 and occupy the flat space defined between the base 11 and the cover when the latter is in its closed condition, or the mirrors can be spaced apart and angularly displaced from the plane of the cover to operative positions extending over the base 11 and holding the cover 22 in the illustrated open position of the latter.

Preferably, the mirrors 12 and 13 are provided with depending feet 26 and 27 projecting below the lower edges of the related mirrors adjacent the side edges of the latter remote from their hinge axis and adapted to bear upon the base 11 when the cover is in its open position and the mirrors extend from the cover over the base, thereby to hold the lower edges of the mirrors spaced upwardly from the base and to provide contact of each mirror with the base at only one point. Further, the aperture of one or the other of the brackets 24 and 25 receiving the ends of the hinge pin 16 is in the form of a slot 28 (Figs. 1 and 2) elongated in the direction of the plane of the cover 22 so that the hinge axis of the mirrors 12 and 13 can cant relative to the cover to ensure simultaneous contact of the feet 26 and 27 with the base 11 when the cover is opened and the mirrors are spread apart to their operative positions. Such simultaneous contact of feet 26 and 27 with base 11 holds the related mirrors in their operative positions, and the possible canting of the hinge axis avoids the spacing of one or the other of the feet from the base that would permit free swinging of the related mirror and that might result if the hinge axis of the mirrors was fixed relative to the cover and the mounting of the mirrors upon the cover was inaccurately effected.

The provision of the feet 26 and 27 on the mirrors 12 and 13 further serves to define gaps 29 (Fig. 3) between the lower edges of the mirrors, in their operative positions, and the base 11 so that a strip 30 of cloth, paper or other sheet material, can be moved over the base 11 and through the gaps 29. It is apparent that, when miscellaneous materials, articles and the like, used as design components, are placed upon the strip 30 and the latter is moved over the base 11 through the gaps 29, the design components disposed on the portion of the strip between the mirrors 12 and 13, and entering into the kaleidoscopic image provided by the latter, are repeatedly changed to correspondingly change the kaleidoscopic image. Further, if certain of the design components disposed on the movable strip are relatively flat, for example, constituted by scraps of colorful fabric, tinfoil, cellophane, paper and the like, so that such flat design components can pass through the gaps 29, while other design components placed on the strip between the mirrors are relatively bulky, for example, constituted by pieces of cork, sponge, wood and the like, and are too high to pass through the gaps 29, movement of the strip will change the flat design components disposed between the mirrors and the bulky design components will be retained between the mirrors and rearranged by striking against the latter, thereby to effect animation of the kaleidoscopic design.

The strip 30 has the additional important function of defining a movable surface upon which two-dimensional design components may be drawn, painted, printed or otherwise provided. Specifically, the strip 30 may have permanent outlines 31 (Fig. 1) of two-dimensional design components or elements printed, or otherwise permanently provided thereon at the time of manufacture to initially guide the operator of the kaleidoscopic device in the placement of miscellaneous materials, articles or the like, upon the strip, or to be colored, with crayon, paint or the like, by the operator.

Preferably, the movable strip 30 is adapted to be easily replaced so that, when predetermined two-dimensional design components or the outlines of such design components are permanently provided on the strip, strips having different arrangements of such two-dimensional design components or outlines thereof can be interchangeably employed to permit greater variation in the kaleidoscopic images that can be achieved.

In the illustrated kaleidoscopic device 10, the strip 30 is removably secured, at its opposite ends, to an endless belt 32, for example, by pieces 33 (Fig. 5) of pressure sensitive or adhesive tape, and the belt 32 passes over two spaced apart, parallel rollers 34 and 35 which are rotatably mounted within the case 17 below the base 11, for example, by stub shafts 36 and 37 (Fig. 3) projecting from the front and back ends, respectively, of each roller and journalled in brackets 38 depending from the base 11. Further, the shaft 36 at the front end of each roller extends through the front wall 18 of the case or container and has a knob 39 suitably secured thereto by which the related roller 34 or 35 can be rotated to cause lateral movement, in opposed directions, of the upper and lower runs of the belt 32. The base 11 has elongated slots 40 therein (Fig. 2) extending parallel and adjacent to the opposite side edges of the base so that the belt 32 and the strip 30 removably secured thereto can pass through the slots 40 to travel across the top surface of the base 11 between the rollers 34 and 35.

It is apparent that the strip 30 carried by the belt 32 will lie in a flat plane over a relatively large area of the base 11 between the slots 40. Preferably, as shown in Fig. 2, the mirrors 12 and 13 are mounted on the cover 22 so that the hinge axis, defined by the pin 16, is eccentrically located relative to the vertical medial line of the cover in the erect, open position of the latter. Thus, in the kaleidoscopic device 10, the hinge axis of the mirrors 12 and 13 is spaced toward the left, as viewed in Fig. 2, from the center of the cover 22, so that, with the mirrors in their spread apart operative positions, a relatively large flat area 30a of the strip 30 will be exposed outside of the space enclosed by the mirrors. Thus, the operator of the device 10 can paint or draw upon a portion of the strip 30 while that portion occupies the large flat, exposed area 30a, and the knobs 40 can then be manipulated to move the decorated portion of the strip into the space between the mirrors, thereby avoiding the inconvenience involved in drawing or painting upon the portion of the strip confined between the mirrors 12 and 13, particularly adjacent the edge of the strip 30 in the corner defined between the mirrors.

In the kaleidoscopic device 10, the mirrors 12 and 13 are free to be set in any desired angles relative to each other and to the cover 22 and setting of desired angles is facilitated by providing a series of spots or recesses 41 upon, or in, which the feet 26 and 27 of the mirrors can be placed to dispose the latter in selected angular arrangements. It is apparent that, with the above simple provision for setting the angular disposition of the mirrors 12 and 13, the space between the latter is completely open at the top and front so that the operator can easily reach or blow into that space for arranging or rearranging the design components placed loosely upon the strip 30.

If desired, the case 17 may have a drawer 42 (Fig. 1) that is received in a drawer opening in the front wall 18 and that is suitably guided to reach into the space between the base 11 and the lower run of the belt 32 when the drawer is in its closed position. The drawer 42 provides a convenient storage receptacle for additional replaceable strips 30 and for the loose two-dimensional, or flat, and three-dimensional, or bulky, design components that may be supplied with the device 10.

An advantage to be noted in the above described arrangement for pivotally mounting the hingedly connected mirrors 12 and 13 on the cover 22 is the automatic swinging, by gravity, of the mirrors away from their stored condition flat against the cover and toward their operative positions in response to movement of the cover from its closed position to its open, erect condition. Thus, even when the kaleidoscope is to be operated by a child, the natural action of opening the cover 22 of case 17 will indicate to the operator the manner in which the mirrors are to be displaced to their operative positions.

Further, it is to be noted that the described kaleidoscopic device permits and encourages the experimental creation by the operator of designs formed by combining miscellaneous loose two-dimensional, or flat, design components three dimensional, or bulky, design components, and designs printed or outlined on the movable strip or drawn or painted by the operator on the latter, thereby to enhance the educational and entertainment value of the device.

Although a particular embodiment of the invention has been described in detail herein and illustrated in the accompanying drawing, by way of example, it is to be understood that the invention is not limited to that particular embodiment, and that various changes and modifications may be effected therein without departing from the scope or spirit of the invention, except as defined in the appended claims.

What is claimed is:

1. A kaleidoscopic device comprising a generally rectangular case open at the top and having a cover hingedly connected to the back of the case for swinging between an erect, open position and a closed position covering the top of the case, a flat base within said case parallel to the bottom of the latter, a pair of mirrors, hinge means including a hinge pin pivotally connecting said mirrors for movement relative to each other to enclose various angles therebetween, and apertured brackets on the face of said cover which is lowermost in said closed position of the latter and receiving the opposite ends of said hinge pin for pivotally mounting said mirrors on said cover, said brackets being disposed so that said hinge pin extends substantially at right angles to the swinging axis of said cover, whereby said mirrors can be folded flat against said cover to lie between the latter and said base when the cover is in said closed position and, as the cover swings to said erect, open position, said mirrors tends to swing apart and away from said cover to operative positions extending over said base for reflecting a kaleidoscopic image of design components on the base in the space between the mirrors, each of said mirrors having a depending foot remote from said hinge pin to effect contact with said base in the operative positions of said mirrors, and at least one of said brackets having an aperture that is elongated in the direction parallel to the plane of said cover to permit canting of said hinge pin relative to the cover and thereby ensure simultaneous contact of the feet of said mirrors with said base for holding said mirrors in said operative positions.

2. A kaleidoscopic device comprising a generally rectangular case open at the top and having a cover hinged to the back of the case for swinging between an open, erect position and a closed position covering the top of the case, a flat base within said case parallel to and spaced from the bottom of the latter and having spaced apart slots extending parallel and adjacent to the opposite side edges of the base, two rollers rotatably mounted in said case below said base and adjacent said slots in the latter, a flexible strip passing through said slots and over said base, means connecting said strip to said rollers for effecting lateral movement of the strip across the base in response to rotation of said rollers, a pair of hingedly connected together mirrors, means pivotally mounting said mirrors on the face of the cover which is foremost with said cover in its erect, open position for swinging of the mirrors relative to said cover about the hinge axis of the mirrors with said hinge axis extending at right angles to the swinging axis of said cover so that said mirrors can be angularly spaced apart to extend over said strip, and feed depending from said mirrors at locations remote from said hinge axis to rest upon said base and space the lower edges of the mirrors from said base so that said strip can move under said lower edges.

3. A kaleidoscopic device comprising a generally rectangular case open at the top and having a cover hinged to the back of the case for swinging between an open, erect position and a closed position covering the top of the case, a flat base within said case parallel to and spaced from the bottom of the latter and having spaced apart slots extending parallel and adjacent to the opposite side edges of the base, two rollers rotatably mounted in said case below said base and adjacent said slots in the latter, a flexible strip passing through said slots and over said base, means connecting said strip to said rollers for effecting lateral movement of the strip across the base in response to rotation of said rollers, a pair of hingedly connected together mirrors, means pivotally mounting said mirrors on the face of the cover which is foremost with said cover in its erect, open position for swinging of the mirrors relative to said cover about the hinge axis of the mirrors with said hinge axis extending at right angles to the swinging axis of said cover so that said mirrors can be angularly spaced apart to extend over said strip, feet depending from said mirrors at locations remote from said hinge axis to rest upon said base and space the lower edges of the mirrors from said base so that said strip can move under said lower edges, and means on said base selectively receiving said feet to angularly position said mirrors while leaving the space between the mirrors unobstructed from in front and above thereby to facilitate the arranging of design components on said strip within said space and viewing of the kaleidoscopic image of such design components reflected by said mirrors.

References Cited in the file of this patent

UNITED STATES PATENTS

| 169,882 | Adams | Nov. 16, 1875 |
| 393,679 | Wiederer | Nov. 27, 1888 |
| 1,973,283 | Buttrick | Sept. 11, 1934 |

FOREIGN PATENTS

| 113,043 | Great Britain | Feb. 7, 1918 |
| 537,481 | Germany | Nov. 4, 1931 |